UNITED STATES PATENT OFFICE.

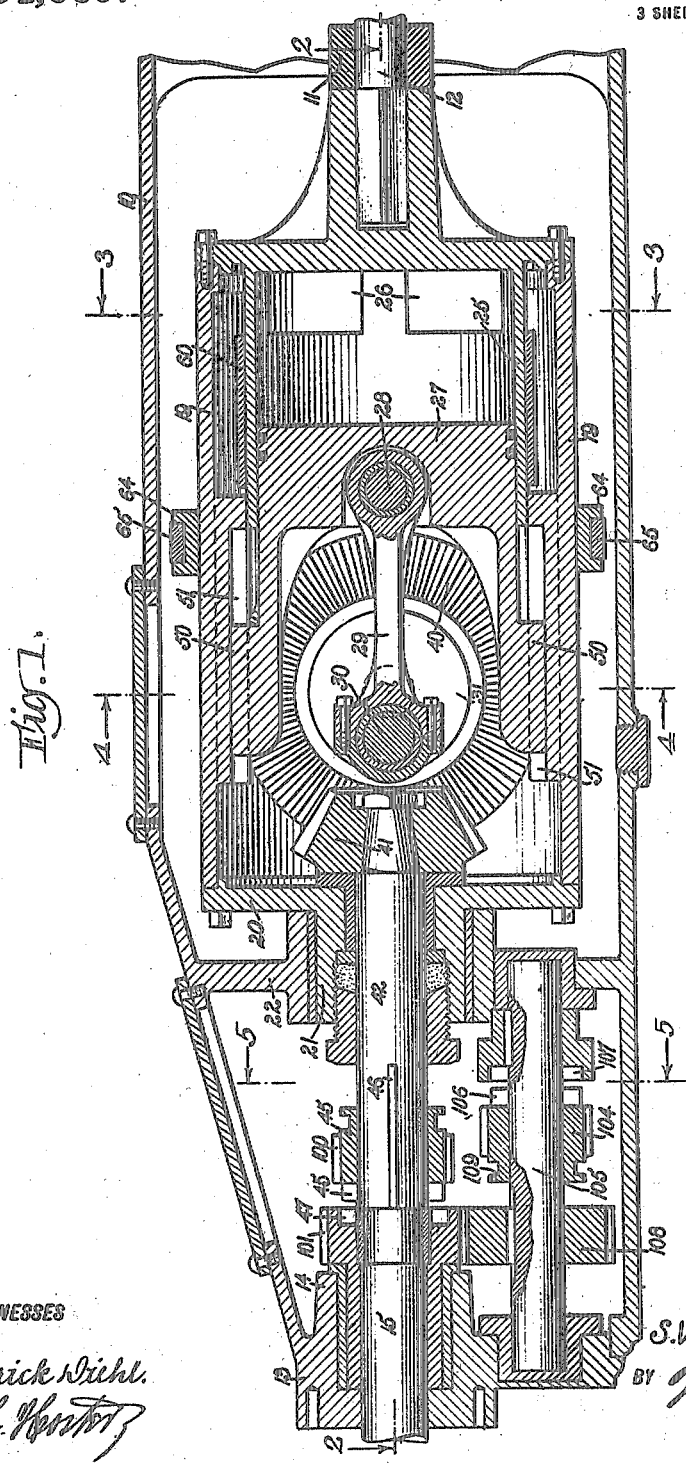

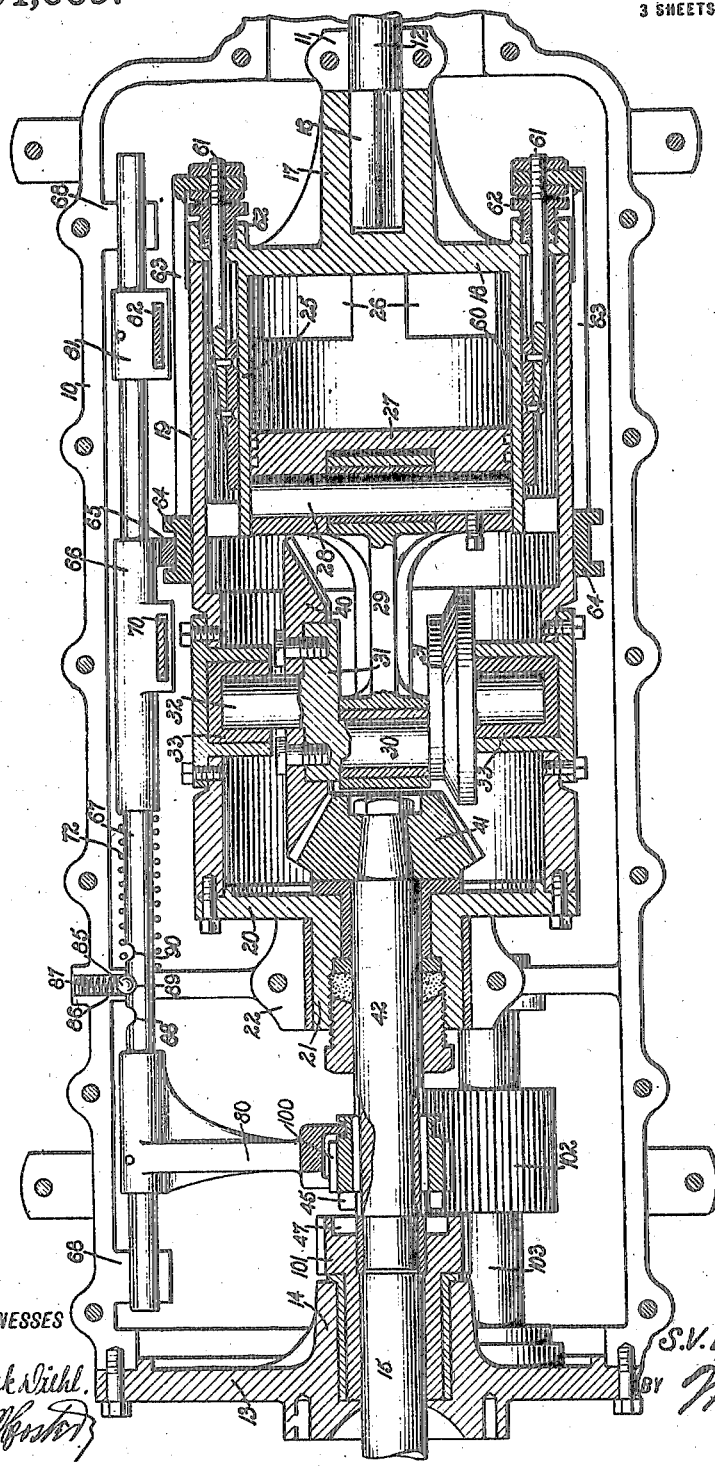

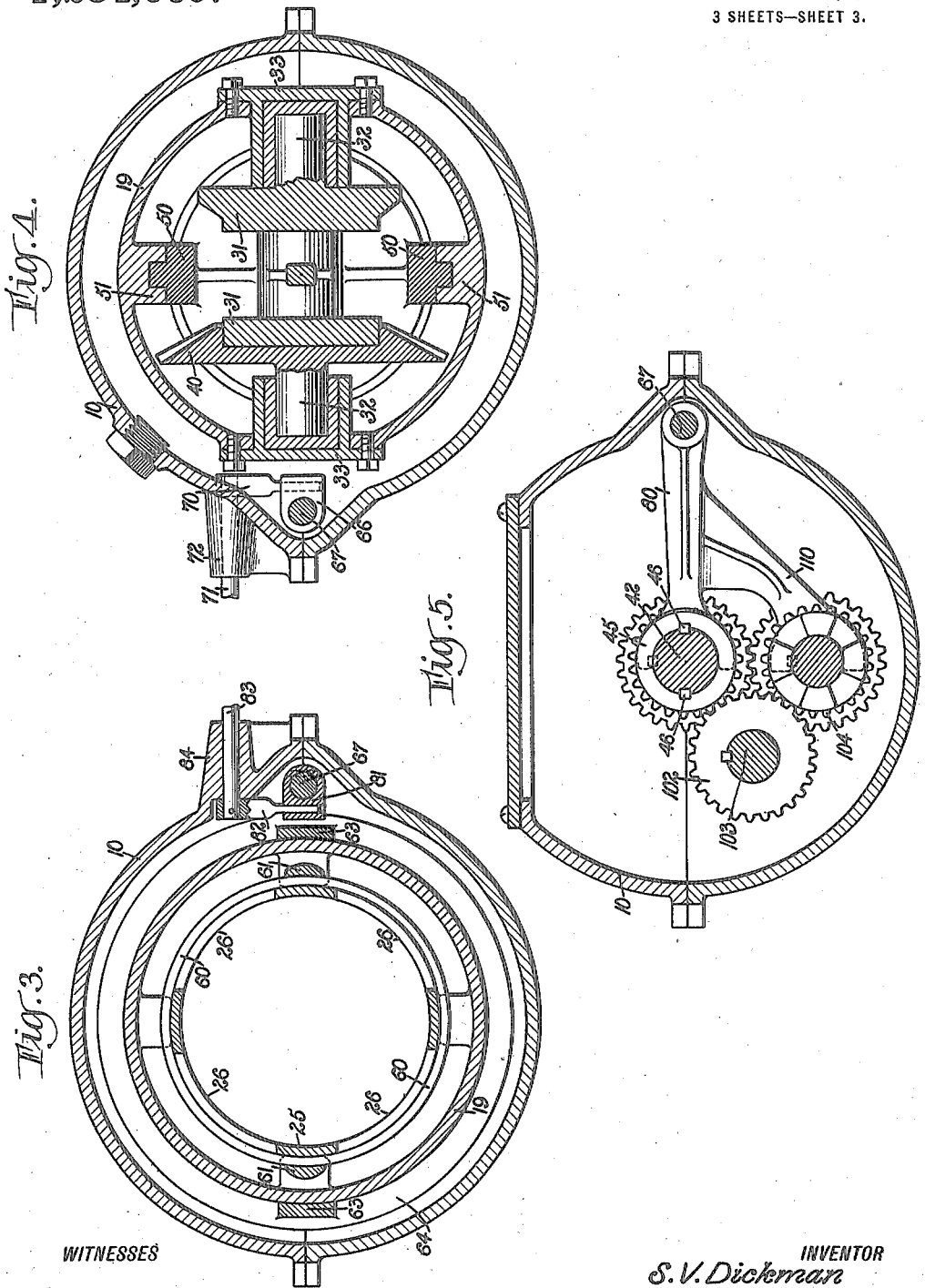

SMITH V. DICKMAN, OF SHAVERTOWN, NEW YORK.

POWER-TRANSMISSION AND SPEED-CHANGING MECHANISM.

1,284,069.      Specification of Letters Patent.      Patented Nov. 5, 1918.

Application filed May 23, 1917. Serial No. 170,404.

*To all whom it may concern:*

Be it known that I, SMITH V. DICKMAN, a citizen of the United States, and a resident of Shavertown, in the county of Delaware and State of New York, have invented a new and Improved Power-Transmission and Speed-Changing Mechanism, of which the following is a full, clear, and exact description.

The object of the invention is to provide a new and improved power transmission and speed changing mechanism for use in automobiles, aeroplanes and other power driven vehicles and other machines, and arranged to transmit the power from a motor or a driving shaft to a driven shaft without appreciable loss and to permit the operator to readily vary the speed of the driven shaft to any desired degree without changing that of the motor shaft, or to reverse the motion of the driven shaft as desired by the operator.

In order to accomplish the desired result, use is made of a revoluble casing driven by the motor, a transmission shaft extending into the said casing, and a transmission device within the said casing and actuated by the rotation of the latter, the said transmission device being connected with the inner end of the said transmission shaft.

A practical embodiment of the invention is represented in the accompanying drawings forming a part of this specification, in which similar characters of reference indicate corresponding parts in all the views.

Figure 1 is a longitudinal central section of the power transmission and speed changing mechanism;

Fig. 2 is a sectional plan view of the same on the line 2—2 of Fig. 1;

Fig. 3 is a cross section of the same on the line 3—3 of Fig. 1;

Fig. 4 is a similar view of the same on the line 4—4 of Fig. 1; and

Fig. 5 is a similar view of the same on the line 5—5 of Fig. 1.

The housing 10 of the power transmission and speed changing mechanism is provided at one end with a bearing 11 in which is journaled the motor or driving shaft 12 driven from a suitable motor or from other driving means. The other end of the housing 10 is provided with a head 13 having a bearing 14 in which is journaled the shaft 15 to be driven, the axis of the shaft 15 coinciding with the axis of the driving shaft 12. The driving shaft 12 terminates in a polygonal portion 16 engaging a correspondingly shaped hub 17 formed on the closed end 18 of a casing 19 closed at the other end by a head 20 having a hub 21 journaled in a bearing 22 supported by the housing 10. The axis of the casing 19 coincides with that of the driving shaft 12 and the driven shaft 15.

Within the casing 19 and preferably forming an integral part of the head 18 is arranged a cylinder 25 provided adjacent the head 18 with ports 26 for the passage of oil or other liquid with which the casing 19 is filled. In the cylinder 25 is mounted to reciprocate a piston 27 provided with a pivot pin 28 engaged by one end of a pitman 29 engaging with its other end a crank pin 30 of a crank 31 forming part of a crank shaft 32 journaled in suitable bearings 33 attached to the casing 19, as plainly illustrated in Fig. 2. By the arrangement described, the cylinder 25, the piston 27 and the crank shaft 32 rotate bodily with the casing 19 when the latter is rotated from the driving shaft 12.

On the crank shaft 32 is secured a bevel gear wheel 40 in mesh with a pinion 41 secured on the inner end of a transmission shaft 42 journaled in the hub 21 of the casing head 20, as plainly shown in Figs. 1 and 2. The transmission shaft 42 has its axis coinciding with that of the driven shaft 15 and on the transmission shaft 42 is mounted a clutch member 45 having a keyway engaging a key 46 secured on the transmission shaft 42 so that the clutch member 45 turns with the transmission shaft 42 and is mounted to slide thereon in the direction of the length of the transmission shaft 42. The clutch member 45 is adapted to engage a clutch member 47 secured on the driven shaft 15 so that when the transmission shaft 42 is rotated and the clutch member 45 is in engagement with the clutch member 47 then the rotary motion of the transmission shaft 42 is transmitted to the driven shaft 15.

The piston 27 is provided at its forward end with members 50 engaging guideways 51 fixed on the casing 19 to guide the piston 27 in its forward and backward movement and to prevent the piston from turning. The ports 26 of the cylinder 25 are controlled by a valve 60 in the form of a sleeve fitting exteriorly on the cylinder 25. The valve 60 is provided with rearwardly extending valve stems 61 (see Fig. 2) extending through stuffing boxes 62 arranged on the head 18 of the casing 19. The outer ends of the stem 61 are connected by rods 63 with a shifting collar 64 engaged by a lug 65 formed on a shifting sleeve 66 mounted to slide on a shifting rod 67 mounted to slide lengthwise in suitable bearings 68 attached to or forming part of the housing 10 (see Fig. 2). The shifting sleeve 66 is engaged by an arm 70 attached to a shaft 71 journaled in a suitable bearing 72 formed on the housing 10 (see Figs. 3 and 4), and the shaft 71 is under the control of the operator to permit of moving the shaft collar 66 lengthwise of the shifting rod 67 to shift the valve 60 relative to the ports 26. A spring 72 is coiled on the shifting rod 67 and bears against one end of the shifting sleeve 66 to aid return movement of the latter whenever it is desired to close the valve 60. The shifting rod 67 is provided with a shifting arm 80 engaging the clutch member 45 to shift the latter lengthwise on the transmission shaft 42 for engagement or disengagement with the clutch member 47 secured on the driven shaft 15. The shifting rod 67 is provided with a fixed shifting collar 81 engaged by an arm 82 attached to the inner end of a shaft 83 journaled in a suitable bearing 84 attached to or forming part of the housing 10 (see Fig. 3). The shaft 83 is under the control of the operator to permit the latter to shift the shifting rod 67 with a view to move the clutch member 45 into or out of engagement with the clutch member 47.

In order to hold the shifting rod 67 in neutral forward driving or reversed position, use is made of a locking ball 85 mounted in a bearing 86 formed on the housing 10. The ball 85 is pressed on by a spring 87 and engages one of three apertures 88, 89 and 90 formed in the shifting rod 67, as plainly indicated in Fig. 2. When the clutch member 45 is in neutral position, as shown in Figs. 1 and 2, then the pawl 85 engages the notch 89, and when the shifting rod 67 is moved forwardly to engage the clutch member 45 with the clutch member 47 then the ball 85 engages the notch 90. When the shifting rod 67 is moved into reversing position, that is, rearwardly then the ball 85 engages the notch 88.

In order to reverse, the following arrangement is made: The clutch members 45 and 47 are provided with gear wheels 100 and 101, of which the gear wheel 100 is in mesh at all times with a gear wheel 102 secured on a countershaft 103 journaled in the forward portion of the housing 10. The gear wheel 102 is in mesh with a gear wheel 104 mounted to turn and to slide loosely on another countershaft 105 likewise journaled in the housing 10. The gear wheel 104 is provided with a clutch member 106 adapted to engage the clutch member 107 keyed on the countershaft 105, and on this shaft is also keyed or otherwise secured a gear wheel 108 in mesh with the gear wheel 101 of the clutch member 47. The gear wheel 104 is provided with a shifting collar 109 engaged by a shifting fork 110 forming part of the shifting arm 80 and moving with the same. Thus when the several parts are in neutral position and the shifting rod 67 is moved forwardly then the clutch member 45 is moved into engagement with the clutch member 47 to transmit the rotary motion of the transmission shaft 42 to the driven shaft 15. The gear wheel 104 moves with the gear wheel 100 in a forward direction but does not effect any connection. When, however, the rod 67 is moved rearwardly from the neutral position shown in Fig. 2 then the gear wheel 104 and its clutch member 106 are moved rearwardly, and the clutch member 106 now engages the clutch member 107 to rotate the countershaft 105 which by the gear wheels 108 and 101 rotates the driven shaft 15 in a reverse direction.

The operation is as follows:

When the several parts are in the position illustrated in Figs. 1 and 2 and the motor shaft 12 is rotated and it is desired to drive the driven shaft 15 in the same direction then the operator shifts the shifting rod 67 forwardly to engage the clutch member 45 with the clutch member 47. The motor shaft 12 rotates the casing 19 and in doing so the bevel gear wheel 40 is rotated by turning on the bevel pinion 41 held stationary at the time. The rotary motion of the bevel gear wheel 40 causes the rotation of the crank shaft 32 whereby the crank 31 and the pitman 29 impart a reciprocating motion to the piston 27 which thus alternately draws the liquid contained in the casing 19 into the cylinder 25 and exhausts the same therefrom. As long as the valve 60 is in full open position, as shown in Fig. 2, the action of the piston 27 is not retarded to any appreciable extent by the pumping of the liquid into and out of the cylinders 25. When the valve 60, however, is moved by the operator into a partly closed position then resistance is offered to the piston 27 on both faces and consequently to the gear wheel 40 to cause the latter to rotate the pinion 41 and the transmission shaft 42, and the rotary motion of the latter is transmitted by the engaged clutch members 45, 47 to the driven shaft 15. It will be noticed that by closing the ports 26 more or less by the valves 60 resistance to the piston may be increased or diminished to correspondingly cause the shaft 15 to be driven at a lower or higher rate of speed. It is understood that when the valve 60 is moved into a partly closed position relative to the ports 26 the inflow of the liquid into the cylinder 25 is retarded during the forward movement of the piston 27 and during the return stroke of the piston 27 the outflow of the liquid from the cylinder 25 is likewise retarded and hence the piston 27 encounters a resistance on the outer face during the forward stroke and like resistance on the inner face during the return stroke. The casing 19 is presumed to rotate at a uniform speed and hence the retardation of the piston 27 causes a like retardation of the gear wheel 40 whereby the pinion 41 is turned at a speed commensurate with the closing of the valve 60. Thus by closing the valve 60 more or less the pinion 41 and its transmission shaft 42 and the driven shaft 15 are driven at a correspondingly higher or lower speed. When it is desired to reverse the engine, it is only necessary for the operator to shift the shifting rod 67 to connect the clutch member 106 with the clutch member 107 and to disengage the clutch member 45 from the clutch member 47.

Having thus described my invention, I claim as new and desire to secure by Letters Patent:—

1. In combination, a power driven revoluble casing filled with a liquid and provided with a cylinder projecting from one head of the casing, said cylinder being concentric with the casing and having ports in its side adjacent the head of said casing, a piston reciprocating in the said cylinder, a manually controlled valve slidable on the cylinder for controlling the ports and thereby the flow of liquid from the casing into and out of the said cylinder, a crank shaft journaled in the casing, a pitman connecting the said piston with the said crank shaft, a gear wheel on the said crank shaft, and a transmission shaft provided with a pinion in mesh with the said gear wheel.

2. In combination, a power driven revoluble casing filled with a liquid and provided with a cylinder concentric with the casing and having a port opening into the casing, a piston reciprocating in the said cylinder, manually controlled means controlling the port and thereby the flow of the liquid from the casing into and out of the said cylinder, a crank shaft journaled in the casing, a pitman connecting the said piston with the said crank shaft, a gear wheel on the said crank shaft, a transmission shaft provided with a pinion in mesh with the said gear wheel, a driven shaft, and manully controlled connecting means connecting the said transverse shaft with the said driven shaft to rotate the latter in a forward or reverse direction.

3. In combination, a power driven revoluble casing filled with a liquid and provided with a cylinder having an open and a closed end, the closed end being provided with ports, a valve controlling the said ports to regulate the flow of the liquid into and out of the cylinder, a piston reciprocating in the said cylinder, a crank shaft journaled in the said casing, a pitman connecting the said piston with the crank shaft, a gear wheel secured on the said crank shaft, a transmission shaft journaled in the said casing and extending to the outside thereof, and a pinion on the said transmission shaft within the said casing and in mesh with the said gear wheel.

4. In combination, a power driven revoluble casing filled with a liquid and provided with a cylinder projecting centrally from one head of the casing and having an open end, the sides of the cylinder adjacent the casing head being provided with ports opening into the casing, a manually controlled valve controlling the said ports to regulate the flow of the liquid into and out of the cylinder, a piston reciprocating in the said cylinder, a crank shaft journaled in the said casing intermediate of its ends and at the longitudinal center thereof, a pitman connecting the said piston with the crank shaft, a gear wheel secured on the said crank shaft, a transmission shaft journaled in the said casing and extending through the other head of the casing, a pinion on the said transmission shaft within the said casing and in mesh with the said gear wheel, a driven shaft in alinement with the transmission shaft and provided with a clutch member, and a manually controlled clutch member mounted to slide on and to turn with the said transmission shaft and adapted to engage the said clutch member on the driven shaft to rotate the latter.

5. In combination, a revoluble casing filled with a liquid, means rotating the said casing, a transmission shaft extending into the casing, a transmission device within the casing and rotating with the same, the said transmission device being connected with the inner end of the said transmission shaft, and manually controlled means controlling the flow of the said liquid to retard or accelerate the motion transmitted by the casing to the said transmission device.

6. In combination, a housing, a closed casing revolubly mounted in the said housing and connected at one end with a driving shaft, a cylinder rigid within the said casing and rotating with the same, the cylinder being open at the forward end and closed at the rear end, the wall of the cylinder being provided at the rear end with ports, a valve mounted to slide exteriorly on the said cylinder and controlling the said ports, a piston reciprocating within the said cylinder and closing and opening the said ports, a transverse crank shaft journaled in the said casing in front of the open end of the said cylinder, a pitman connecting the said crank shaft with the said piston, a gear wheel secured on the said crank shaft, and a transmission shaft journaled in the forward end of the said casing and provided with a pinion in mesh with the said gear wheel.

7. In combination, a housing, a closed casing revolubly mounted in the said housing and connected at one end with a driving shaft, a cylinder rigid within the said casing and rotating with the same, the cylinder being open at the forward end and closed at the rear end, the wall of the cylinder being provided at the rear end with ports, a valve mounted to slide exteriorly on the said cylinder, a clutch member mounted to turn with and to slide on the said transmission shaft, a driven shaft having a clutch member adapted to be engaged by the said clutch member on the transmission shaft, a manually controlled shifting rod slidable lengthwise on the said housing and having a shifting fork engaging the clutch member on the said transmission shaft, a manually controlled spring-pressed shifting sleeve slidable on the said shifting rod and provided with a lug, a shifting collar slidable exteriorly on the said cylinder, and a connection connecting the said shifting collar with the said valve to shift the latter relative to the said ports.

8. In combination, a power driven revoluble casing filled with a liquid and provided with a cylinder, a piston reciprocating in the said cylinder, manually controlled means controlling the flow of the liquid into and out of the said cylinder, a crank shaft journaled in the casing, a pitman connecting the said piston with the said crank shaft, a gear wheel on the said crank shaft, a transmission shaft provided with a pinion in mesh with the said gear wheel, a guideway in the said casing, and extension members on the said piston and engaging the said guideway.

SMITH V. DICKMAN.